Jan. 16, 1934.  F. W. GODSEY, JR  1,943,524

SYSTEM AND APPARATUS FOR REGULATION

Filed May 11, 1931

Frank W. Godsey, Jr.
INVENTOR

BY his ATTORNEYS
Janney, Blair & Curtis

Patented Jan. 16, 1934

1,943,524

UNITED STATES PATENT OFFICE 1,943,524

SYSTEM AND APPARATUS FOR REGULATION

Frank W. Godsey, Jr., New Haven, Conn., assignor to The Safety Car Heating & Lighting Company, a corporation of New Jersey Application May 11, 1931. Serial No. 536,405

11 Claims. (Cl. 171—229)

This invention relates to electric regulation and more particularly to a system and apparatus for the regulation of alternating current circuits.

One of the objects of this invention is to provide a simple and practical system and apparatus for the regulation of such functions as current or voltage of the output of a source of alternating current or of the alternating current energy in a work or translation circuit. Another object is to provide a system and apparatus of the above-mentioned character that will be inexpensive, highly sensitive and accurate and of high efficiency. Another object is to provide a carbon pile type of regulating system and apparatus in which such objects as the above may be realized in a thoroughly dependable and practical and inexpensive manner. Other objects will be in part obvious or in part pointed out hereinafter.

The invention accordingly consists in the features of construction, combinations of elements, and arrangements of parts as will be exemplified in the structure to be hereinafter described and the scope of the application of which will be indicated in the following claims.

In the accompanying drawing in which are shown several of various possible embodiments of my invention, Figure 1 shows diagrammatically a preferred embodiment of my regulating system and apparatus showing the arrangement of the parts where regulation for constancy of voltage is to be achieved;

Similar reference characters refer to similar parts throughout the several views of the drawing.

Figure 1:
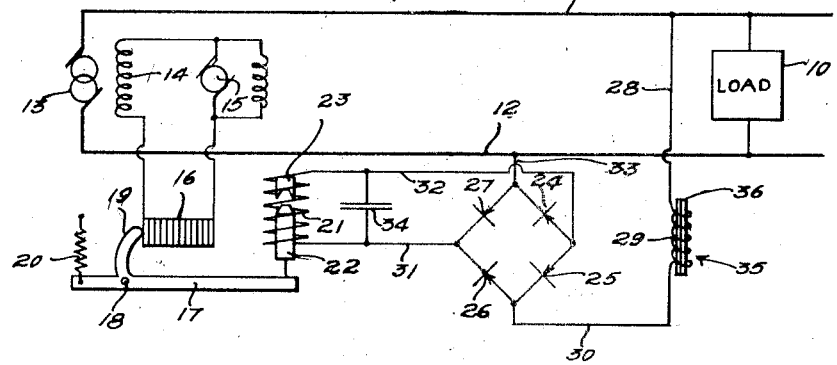

Referring to Figure 1, I have shown an alternating current load generally indicated at 10 supplied by main line conductors 11—12 with alternating current energy from a suitable source such as an alternator 13. Alternator 13 is provided with an exciting field 14 which may be supplied with exciting direct current from any suitable source, such as an exciter 15.

The voltage applied to the load 10 I regulate or control by means of a variable resistance preferably taking the form of a compressible carbon pile 16 and the latter I preferably position in a suitable circuit so as to control the excitation supplied to the field 14 of the alternator 13; hence, as is shown in Figure 1, I position the carbon pile 16 directly in the circuit of the field winding 14.

The pressure on the carbon pile 16 is preferably controlled by a bell crank lever 17, pivoted at 18, and having one arm 19 thereof engaging the free or unanchored end of the carbon pile 16; a spring 20, preferably adjustable, tends to swing the lever 17 in clockwise direction so as to compress the carbon pile and thus reduce its resistance and the action of the spring 20 is opposed by a solenoid having a winding 21 acting upon a core 22 connected to the bell crank lever 17.

The coil 21 and the magnetic circuit to which it is related are designed and constructed, as is diagrammatically indicated in the drawing, so that the winding 21, when energized by a certain value of uni-directional currents, holds the core 22 in whatever position it has been moved within its range of movement; for this purpose the upper end of core 22 may be tapered and made to coact with a fixed core member 23 provided with a correspondingly tapered recess with which the upper end of the core 22 coacts, in a manner now known to those skilled in the art. Winding 21 is constructed to be responsive to the voltage across the main line conductors 11—12 and is energized from the latter but with a current that is uni-directional and relatively free from pulsations of low frequency and is thus made to achieve the above described action most efficiently. For purposes of illustration, the work circuit 11—12 may be considered to be one energized by alternating current energy of relatively low frequency such as 60 or 25 cycles usually employed in commercial power circuits.

To achieve this uni-directional energization of winding 21 from the alternating current circuit 11—12, I provide a suitable rectifying arrangement which, insofar as certain features of my invention are concerned, may take any suitable form; this rectifying arrangement preferably comprises a number of rectifiers, preferably four in number, and they are indicated in Figure 1 at 24, 25, 26 and 27. They may, for example, be of the copper oxide disk type, gaseous discharge devices, thermionic devices, electrolytic rectifying devices, or the like, and they are connected for double-wave rectification, being preferably arranged in a sort of bridge circuit, as shown in Figure 1.

More specifically, and assuming one half-wave of the alternating potential across circuit 11—12 to be momentarily effective, a current corresponding to this half-wave may be considered as flowing from main line conductor 11, conductor 28, a winding 29, which, with its associated parts, will be more clearly described hereinafter, conductor 30, rectifier or valve 26, conductor 31, winding 21, conductor 32, valve 24, and by way of conductor 33 to main line conductor 12. The next succeeding half-wave of this alternating potential, being reversed in direction, is effective to send a current through winding 21 but now in a direction from the main line conductor 12, conductor 33, valve 27, conductor 31, winding 21, conductor 32, valve 25, conductor 30, winding 29, and by way of conductor 28 to the other side of the work circuit, and hence to main line conductor 11.

This action of the valves in the circuit arrangement above described is repeated for each cycle of the alternating potential to be regulated and it will be noted that the current flow through the winding 21 is always in the same direction. Desirably a condenser 34 may be bridged across the winding 21 to smooth out the successive half-waves of current corresponding to these successive rectified half cycles, and thus the current through winding 21 is a substantially steady but uni-directional current proportional to the effective value of the alternating potential across the circuit 11—12.

Figure 2:
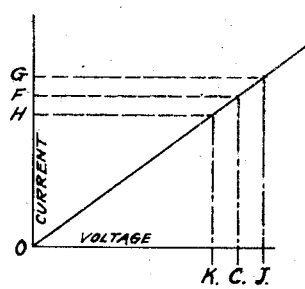
Figure 2 is a graphic representation of a regulating characteristic of apparatus heretofore known.

Disregarding the winding 29 above-mentioned, and if the current through the regulating coil 21 were to be plotted as ordinates against the voltage applied across conductors 30 and 31 as abscissæ, a graph somewhat like that shown in Figure 2 at OA would result, and it will be seen that the resultant characteristic is substantially a straight line, the current through the winding 21 being substantially a straight line function of the voltage applied to the regulating circuit. Let it be assumed that the voltage across the circuit 11—12 is to be kept constant at a value of OC in Figure 2 and that hence a current value equal to OF is necessary to hold the core 22 in equilibrium with respect to the pull of spring 20. Let it also be assumed that the best operating characteristic achievable with the carbon pile controlling apparatus is such that a current increase in the amount FG is necessary to cause the pull of coil 21 to overcome the pull of spring 20 and that a current decrease equal to the decrement FH is necessary in winding 21 to permit spring 20 to overcome the pull of winding 20; in other words, to achieve actuation of the carbon pile 16 a range of change of current through the winding 21 must take place from the value OF to the value OG upon an increase in voltage across the circuit 11—12 or a change in current through the winding 21 from the value OF to the value OH upon a decrease in the voltage across the circuit 11—12. That means, where the arrangement has the straight line characteristic shown in Figure 2, that the voltage across the circuit 11—12 must increase from a value OC to a value OJ before correction takes place, or must decrease from the value OC of Figure 2 to the value OK of Figure 2 before correction of the decrease takes place. The inherent physical properties of the carbon pile and its associated pressure-controlling devices thus impose certain limitations upon the accuracy or precision of operation of the regulating system and in many instances of practical use the fraction represented by the range of change of voltage KJ to the intended value of voltage to be maintained, namely, OC, is entirely too large, thus precluding the application of this otherwise highly advantageous apparatus in practice; this fraction might in practice represent a value as high as 10%.

According to certain features of my invention, however, I am enabled to reliably retain the many advantages of the kind of apparatus and system above described while doing away with such limitations as those mentioned immediately above, and accordingly I interpose in the circuit a reactor generally indicated at 35 having the winding 29 associated with a magnetic core 36 of any suitable construction, the core 36 forming preferably an open magnetic circuit and the latter having, therefore, relatively high reluctance; thus winding 29 will require a relatively high "magnetizing" current. This iron-cored reactor 35 is constructed to have a high impedance to current flow when voltages substantially below the desired voltage across the circuit 11—12 are effective and the winding and the core are so proportioned that the core operates at substantial magnetic saturation in the neighborhood of the voltage intended to be maintained constant across the circuit 11—12. Thus, the core operates under a substantially saturated condition so that changes in voltage cause widely disproportionate changes in current flow due to the fact that the component of magnetizing current, when the core is substantially saturated, is so high.

Figure 3:
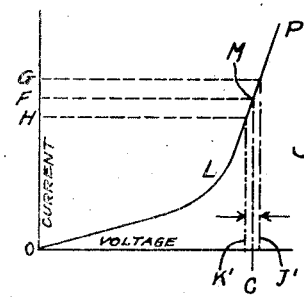
Figure 3 is a graphic representation of a regulating characteristic achieved by means of my invention and illustrates graphically certain improved results I achieve, all by comparison with Figure 2.

In Figure 3 is shown the operating characteristic of the system of Figure 1. The values OH, OF and OG of Figure 3, being determined by the inherent properties of the carbon pile 16 with its associated operating devices, are the same as the corresponding values of Figure 2, but the operating characteristic OP, instead of being a straight line characteristic, has a distinct bend or knee therein as at the point L which may be considered to be the point at which saturation of the core 36 is about to begin; thereafter the portion LP, due to the magnetizing current, is very steep compared to the slope of the characteristic OA of Figure 2 with the result that the departures in voltage necessary to bring about a current change through the winding 21 to operate the carbon pile 16 are vastly smaller than was the case with the circuit arrangement with the reactor 35, as is illustrated by the graph of Figure 2. This is graphically brought out by comparison of Figure 3 with Figure 2. The necessary current increment FG (the same in both Figures 2 and 3) necessary to actuate the carbon pile when the voltage increases, is achieved, by way of my invention, with a voltage change from OC to OJ' (Figure 3) instead of the much greater change from OC to OJ of Figure 2; likewise, a change in voltage across conductors 11—12 in a decreasing direction takes place throughout the small range from OC to OK' (Figure 3) to achieve correction of this departure rather than the vastly greater change from OC to OK of Figure 2.

The percent regulation represented by the fraction K', J' to OC, instead of being on the order of 10%, as in Figure 2, is now on the order of 1%; these figures are, of course, purely illustrative but they typify the enormous improvement in the sensitiveness and precision of regulation that I am enabled to achieve. Saturation of the core 36 is achieved preferably at about the point K or preferably slightly below that point, thus to insure that the departures from the intended value of voltage bring about disproportionately great changes of current through the winding 21, due to the magnitude of the factor which the magnetizing current that must be supplied to the reactor 35 represents.

This magnetizing current component is, for such reasons as have above been pointed out, relatively very high. The relatively large change in current flow through winding 21 that results from the relatively small departure from intended value of the voltage across conductors 11—12 may also be contributed to by the component of current that goes to supply the iron losses in the reactor 35; in the iron core 36 hysteresis and eddy current losses take place and these losses are, furthermore, relatively high because of the high flux density at which the iron core 36 operates. Preferably, also, the resistance of the winding 29 is relatively low so as to maintain the resistance drop through the reactor 35 relatively small.

Thus, the carbon pile 16 is promptly and quickly made effective, by changing the excitation supplied to the alternator 13, to correct the departures from intended value of the voltage to be maintained across the work circuit 11—12 and thus a highly efficient and accurate and sensitive regulation of the circuit is dependably achieved.

Figure 4:
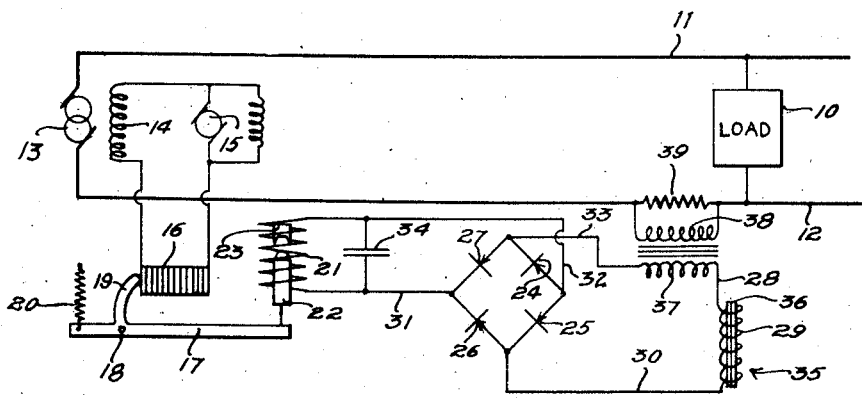
Figure 4 is a diagrammatic representation similar to that of Figure 1 but showing a system and apparatus arranged for regulation for constant current in an alternating current circuit.

If it is desired to regulate the alternator 13 to supply the load 10 with constant current, my invention may be carried out as is illustrated in Figure 4 in which conductors 33 and 28, instead of being connected directly across the work circuit 11—12 as in Figure 1, are connected across the secondary or high voltage winding 37 of a transformer, the low voltage winding 38 of which is connected directly in one of the main line conductors, such as the conductor 12, so that the voltage of the winding 37 varies as the current flow through the winding 38 varies. The winding 38 may, if desired, be shunted by a low resistance 39. The transformer 38—37 may be considered as a step-up potential transformer, the low voltage winding 38 of which is responsive to the potential drop across the shunt or low resistance 39. In view of what has been above set forth in connection with Figures 1, 2 and 3, the operation of the system and apparatus of Figure 4 will be readily understood. It might be noted, however, that increases in current beyond the desired value in the circuit 11—12 cause an increase in the voltage of transformer winding 37 but that this increase need be but a very small increase (see Figure 3) in order to achieve actuation of the carbon pile 16 under the control of the regulating coil 21 while decreases in current from the intended value cause like decreases in the voltage of transformer winding 37 but these decreases need be but relatively slight (see Figure 3) in order to achieve a correcting actuation of the carbon pile 16, all due to the action of the reactor 35.

It will thus be seen that there has been provided in this invention a system and apparatus in which the several objects hereinbefore noted, together with many thoroughly practical advantages, are successfully achieved and that such limitations of the carbon pile and its operating mechanisms, as above pointed out, are successfully avoided and that the advantages of the carbon pile and immediately associated parts may be now realized in practice in fields where the carbon pile was heretofore practically unavailable.

As many possible embodiments may be made of the above invention and as many changes might be made in the embodiment above set forth, it is to be understood that all matter hereinbefore set forth, or shown in the accompanying drawing, is to be interpreted as illustrative and not in a limiting sense.

I claim:

1. In apparatus of the character described, in combination, a source of alternating current, a carbon pile for controlling a function of the output of said source, a winding and a movable magnetic member related and constructed to each other so that said movable member is held by said winding in whatever position said member is moved thereby upon the reestablishment of a given effective energization of said winding, said movable member being connected to affect said carbon pile, rectifying means interposed between said winding and said source, and a reactance having a magnetic core operating at substantial saturation so as to require a high magnetizing current, for amplifying the effect of changes in said function upon said winding.

2. In apparatus of the character described, in combination, a source of alternating current, a carbon pile for controlling a function of the output of said source, a winding and a movable magnetic member related and constructed to each other so that said movable member is held by said winding in whatever position said member is moved thereby upon the reestablishment of a given effective energization of said winding, said movable member being connected to affect said carbon pile, rectifying means interposed between said winding and said source, and magnetic amplifying means interposed between said rectifying means and said source for increasing the effect of changes in said function upon said winding.

3. In apparatus of the character described, in combination, a source of alternating current, a carbon pile for controlling a function of the output of said source, a winding and a movable magnetic member related and constructed to each other so that said movable member is held by said winding in whatever position said member is moved thereby upon the reestablishment of a given effective energization of said winding, said movable member being connected to affect said carbon pile, rectifying means interposed between said winding and said source, and means operating at low power factor and having the characteristic of causing disproportionately greater changes for a given change in said function, for affecting the energization of said winding.

4. In apparatus of the character described, in combination, a source of alternating current, a carbon pile for controlling a function of the output of said source, a winding and a movable magnetic member related and constructed to each other so that said movable member is held by said winding in whatever position said member is moved thereby upon the reestablishment of a given effective energization of said winding, said movable member being connected to affect said carbon pile, rectifying means interposed between said winding and said source, and means interposed between said source and said rectifying means and in circuit with said winding for causing disproportionately greater changes in current flow through the latter for given changes in said function.

5. In apparatus of the character described, in combination, an alternating current circuit, regulating means including a carbon pile for regulating a function of the energy in said circuit, a coil for controlling said carbon pile, said coil being connected to receive energy from said circuit and to respond to changes in said function, a device having a magnetic core and constructed so that changes in said function, when impressed thereon, cause relatively great and disproportionate changes in current through said device, and means causing the energization of said winding to be affected by current changes in said device.

6. In apparatus of of the character described, in combination, an alternating current circuit, and electro-magnetic regulating means for controlling a function of the energy in said circuit, said means including a winding, amplifying means, and rectifying means interposed between said amplifying means and said winding.

7. In a system of the character described, in combination, a source of alternating current, a work circuit supplied thereby, a carbon pile for controlling a function of the current flowing to said work circuit, a winding and a movable magnetic member constructed and related to each other so that said movable member is held by said winding in whatever position said member is moved thereby upon the reestablishment in said winding of a given unidirectional energization thereof, means relating said movable magnetic member to affect said carbon pile, a pair of coupled circuits in one of which said winding is included and the other of which derives alternating energy from said source, and a device in said other circuit having an asymmetrical characteristic and adapted thereby to amplify departures from the function to be regulated, said circuits being coupled by full-wave rectifying means whereby said device is affected by all the components of each cycle in the alternating current energy and whereby said winding is uni-directionally energized.

8. In a system of the character described, in combination, a source of alternating current, a work circuit supplied thereby, a carbon pile for controlling a function of the current flowing to said work circuit, a winding and a movable magnetic member constructed and related to each other so that said movable member is held by said winding in whatever position said member is moved thereby upon the reestablishment in said winding of a given uni-directional energization thereof, means relating said movable magnetic member to affect said carbon pile, a pair of coupled circuits in one of which said winding is included and the other of which derives alternating energy from said source, and an electromagnetic winding with a core operating adjacent saturated condition in said other circuit, said circuits being coupled by full-wave rectifying means whereby all components of every cycle of the alternating energy in said other circuit function with respect to said second winding and core and said first winding is energized by uni-directional current.

9. In a system of the character described, in combination, a source of alternating current, a work circuit supplied thereby, a carbon pile for controlling a function of the current flowing to the work circuit, a winding and a movable magnetic member constructed and related to each other so that said movable member is held by said winding in whatever position said member is moved thereby upon the reestablishment in said winding of a given uni-directional energization thereof, means relating said movable magnetic member to affect said carbon pile, a device including a coil and a core constructed and arranged to require a relatively high magnetizing current when energized by alternating current, and a circuit for relating said winding and said device to said work circuit to respond to changes in the function of the current that is to be regulated, said circuit having included therein means for causing said winding to be energized by uni-directional current derived from the alternating current in said circuit without affecting the energization of the coil of said device by alternating current energy.

10. In a system of the character described, in combination, a source of alternating current, a work circuit supplied thereby, a carbon pile for controlling a function of the current flowing to the work circuit, a winding and a movable magnetic member constructed and related to each other so that said movable member is held by said winding in whatever position said member is moved thereby upon the reestablishment in said winding of a given uni-directional energization thereof, means relating said movable magnetic member to affect said carbon pile, a device including a coil and a core constructed and arranged to require a relatively high magnetizing current when energized by alternating current, and a circuit for relating said winding and said device to said work circuit to respond to changes in the function of the current that is to be regulated, said circuit having included therein a bridge having therein rectifying means related so that the coil of said device is energized by alternating current energy and said winding is energized by uni-directional current.

11. In a system of the character described, in combination, an alternating current circuit, electromagnetic regulating means for controlling a function of the energy in said circuit and constructed to be energized by uni-directional current, electromagnetic means functioning to amplify when energized by alternating current energy, and means electrically relating said two means to each other and to said circuit and including rectifying means constructed and related to rectify the amplified alternating current energy and supply said regulating means with uni-directional current while passing therethrough the alternating current energy supplied to said amplifying means.

FRANK W. GODSEY, Jr.